US010268661B2

(12) United States Patent
Tashman et al.

(10) Patent No.: US 10,268,661 B2
(45) Date of Patent: Apr. 23, 2019

(54) SYSTEMS AND METHODS TO FACILITATE ACTIVE READING

(75) Inventors: Craig S. Tashman, Atlanta, GA (US); W. Keith Edwards, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 690 days.

(21) Appl. No.: 13/876,463

(22) PCT Filed: Mar. 16, 2011

(86) PCT No.: PCT/US2011/028595
§ 371 (c)(1),
(2), (4) Date: Mar. 27, 2013

(87) PCT Pub. No.: WO2012/044363
PCT Pub. Date: Apr. 5, 2012

(65) Prior Publication Data
US 2013/0191711 A1 Jul. 25, 2013

(51) Int. Cl.
*G06F 17/21* (2006.01)
*G06F 17/24* (2006.01)

(52) U.S. Cl.
CPC .......... *G06F 17/211* (2013.01); *G06F 17/241* (2013.01)

(58) Field of Classification Search
CPC ......... G06F 17/30905; G06F 17/30873; G06F 17/30882; G06F 17/30887
See application file for complete search history.

(56) References Cited

U.S. PATENT DOCUMENTS

| 5,634,064 | A | 5/1997 | Warnock et al. | |
|---|---|---|---|---|
| 6,219,679 | B1* | 4/2001 | Brisebois | G06F 17/30855 707/E17.013 |
| 6,654,036 | B1* | 11/2003 | Jones | G06F 3/0481 715/788 |
| 6,654,039 | B1* | 11/2003 | Hollines, III | G06F 17/30595 707/999.003 |
| 7,859,539 | B2* | 12/2010 | Beckman | G06F 3/0485 345/473 |

(Continued)

OTHER PUBLICATIONS

Theodor Holm Nelson, "Xanalogical Structure, Needed Now More than Ever", publisher: ACM, published: 2000, pp. 1-32.*

(Continued)

*Primary Examiner* — Wilson W Tsui
(74) *Attorney, Agent, or Firm* — Troutman Sanders LLP; Ryan A. Schneider

(57) ABSTRACT

Review systems and methods facilitate active reading by providing a flexible environment in which users can examine documents. A review system can comprise a virtual workspace, a document view region, a preview region, and optional document objects. The virtual workspace can simulate a desktop or other physical workspace. The document view region can display a portion of an open document at a magnification sufficient for reading. The preview region can display the document at a magnification sufficient to enable the general layout of the entire document to be determined. The document objects can be created from the document through tools of the review system. These document objects can be independently moveable throughout the virtual workspace as needed to facilitate the user's active reading process.

33 Claims, 10 Drawing Sheets

(56) References Cited

U.S. PATENT DOCUMENTS

| | | | |
|---|---|---|---|
| 7,966,561 B1* | 6/2011 | Nguyen | G06Q 40/00 715/221 |
| 8,332,754 B2* | 12/2012 | DeLuca | G06F 17/2247 715/273 |
| 2005/0052427 A1 | 3/2005 | Wu et al. | |
| 2005/0055628 A1 | 3/2005 | Chen et al. | |
| 2005/0183005 A1 | 8/2005 | Denoue et al. | |
| 2005/0257400 A1* | 11/2005 | Sommerer | G06F 17/30873 36/13 |
| 2006/0129944 A1* | 6/2006 | Berquist | G06T 3/00 715/764 |
| 2007/0192359 A1 | 8/2007 | Steeb et al. | |
| 2007/0192729 A1* | 8/2007 | Downs | G06F 3/04855 715/786 |
| 2007/0266342 A1* | 11/2007 | Chang | G06F 17/30867 715/810 |
| 2008/0104535 A1 | 5/2008 | DeLine et al. | |
| 2008/0307308 A1* | 12/2008 | Sullivan | G06F 17/30905 715/723 |
| 2008/0309634 A1 | 12/2008 | Hotelling et al. | |
| 2009/0033633 A1* | 2/2009 | Newman | G06Q 30/02 345/173 |
| 2009/0164887 A1* | 6/2009 | Ikegami | G06F 17/30905 715/247 |
| 2009/0193351 A1* | 7/2009 | Lee | G06F 3/0482 715/769 |
| 2009/0199093 A1* | 8/2009 | Chakravarty | G06F 17/30265 715/273 |
| 2009/0199106 A1* | 8/2009 | Jonsson | G06F 17/30884 715/744 |
| 2009/0222717 A1* | 9/2009 | Nelson | G06F 17/30887 715/207 |
| 2009/0249178 A1 | 10/2009 | Ambrosino et al. | |
| 2009/0249257 A1 | 10/2009 | Bove et al. | |
| 2010/0050076 A1 | 2/2010 | Roth | |
| 2010/0162160 A1* | 6/2010 | Stallings | G06F 3/0485 715/784 |

OTHER PUBLICATIONS

International Search Report and Written Opinion dated Jan. 19, 2011 for related PCT Application No. PCT/US2010/050911.
International Search Report and Written Opinion dated Jun. 13, 2011 for related PCT Application No. PCT/US2011/028595.

\* cited by examiner

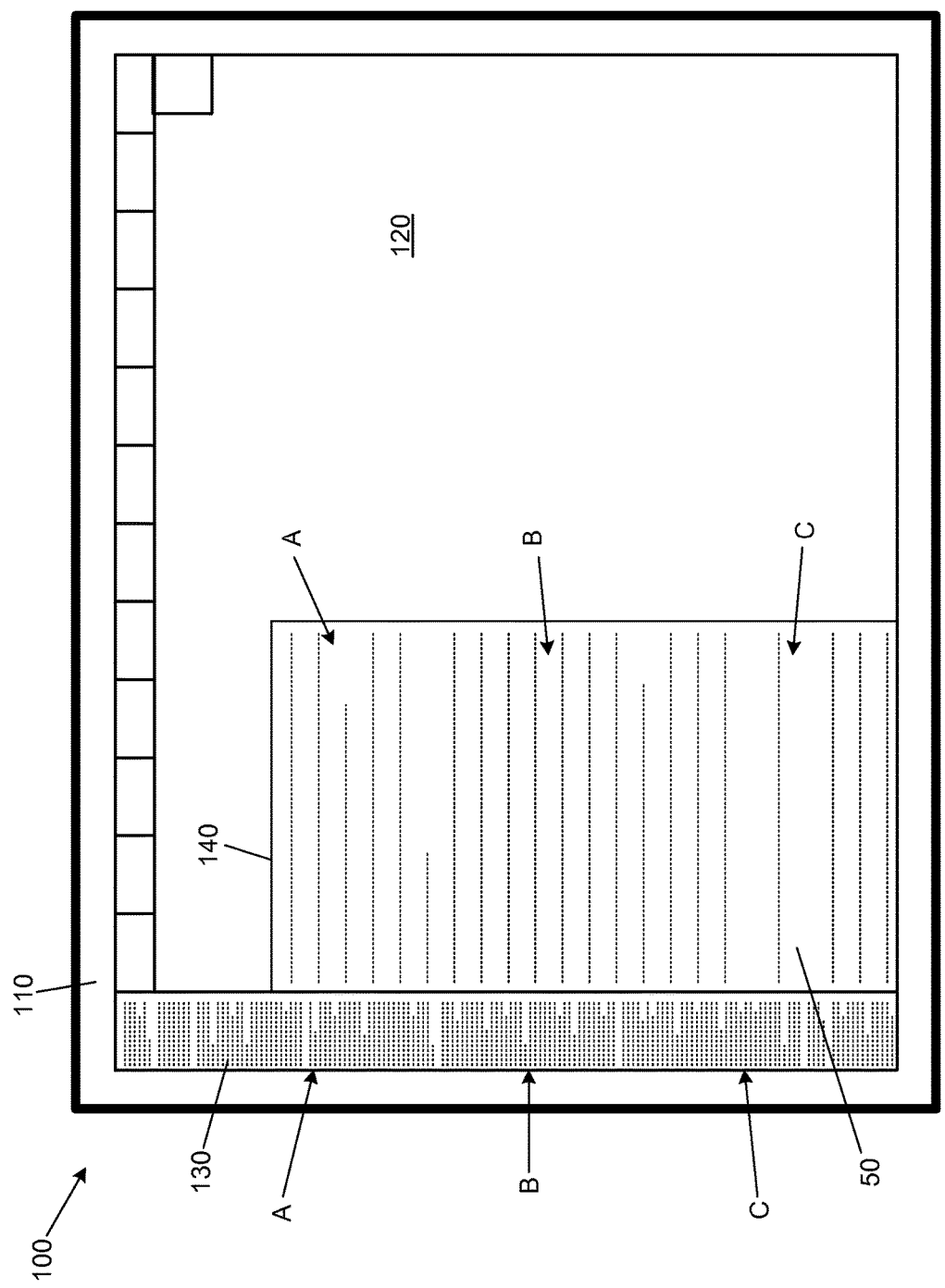

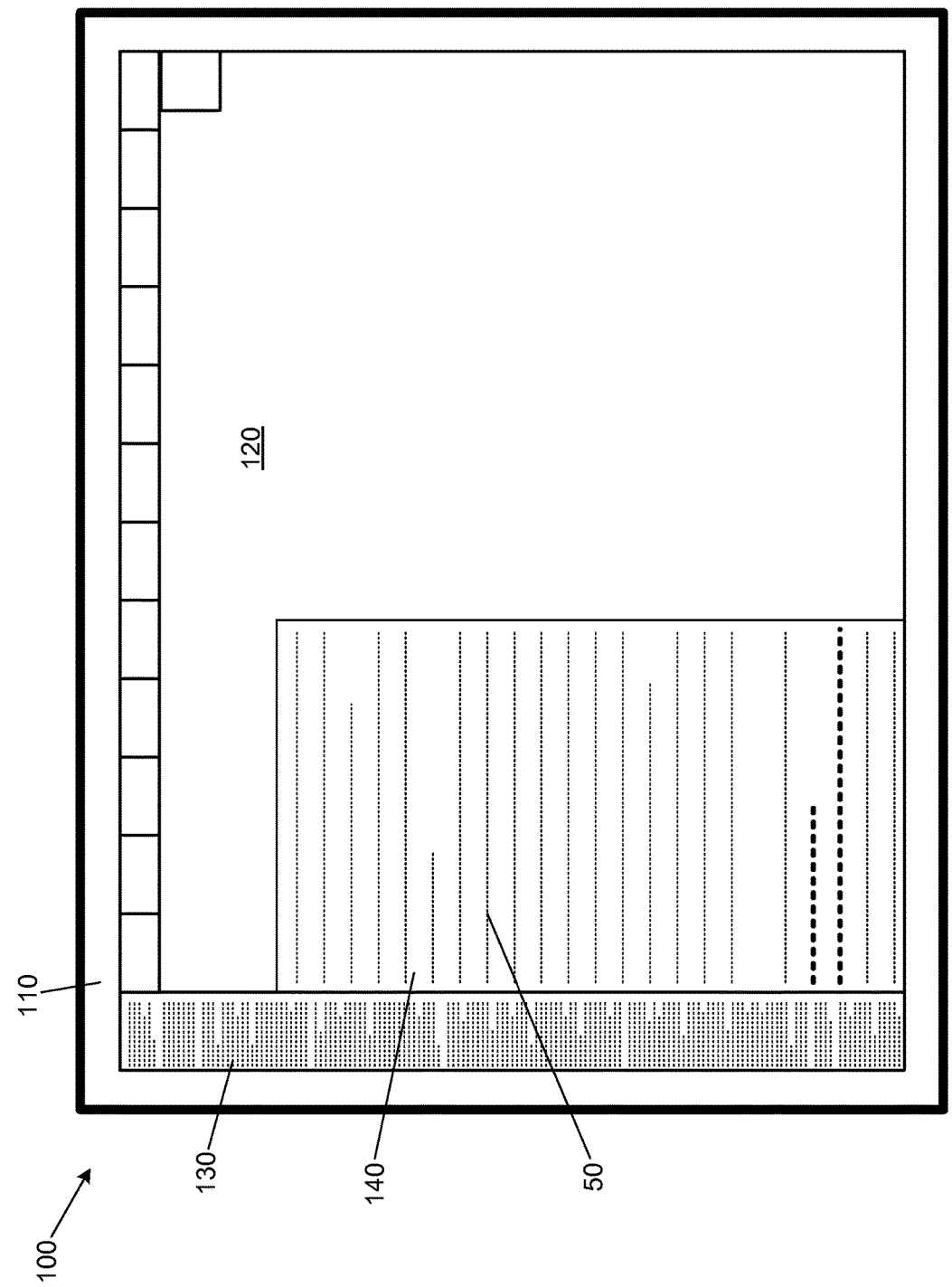

SYSTEMS AND METHODS TO FACILITATE ACTIVE READING

STATEMENT REGARDING FEDERALLY SPONSORED RESEARCH OR DEVELOPMENT

This invention was made with government support under Grant No. IIS0705569 awarded by National Science Foundation. The government has certain rights in the invention.

CROSS-REFERENCE TO RELATED APPLICATIONS

This application is a U.S. National Stage of International Application No. PCT/US2011/028595, filed 16 Mar. 2011, which claims priority to PCT Patent Application No. PCT/US2010/050911, filed 30 Sep. 2010, which claims a benefit under 35 U.S.C. § 119(e) of U.S. Provisional Application Ser. No. 61/247,279, filed 30 Sep. 2009. The entire contents and substance of these applications are hereby incorporated by reference as if fully set out below.

TECHNICAL FIELD

Various embodiments of the present invention relate to digital documents and, more particularly, to systems and methods to facilitate active reading of digital documents.

BACKGROUND

From magazines and novels to review of important document, reading forms a critical part of our lives, and many reading tasks involve a rich interaction with the text. This rich interaction, known as active reading, can be conducted to answer questions, perform analysis, or obtain information. Active reading can involve highlighting, annotating, outlining, note-taking, comparing, and searching. As a result, active reading generally demands more of a reading medium than simply an ability to advance pages.

Although paper supports bimanual interaction and freeform annotation within the boundaries of a single page, paper lacks the flexibility to provide, for example, content rearrangement, document overviews, and annotation outside of page boundaries. Additionally, although the tangibility of paper supports some rapid forms of navigation, such as dog-earing and bookmarking with a finger, paper provides little flexibility to create a customized navigational structure. Modern pen-based computerized tablets do a fine job of imitating paper, which benefits users by providing a familiar medium, but as a result, these pen-based tablets suffer from the same limitations as paper. Thus, neither paper nor modern computer systems adequately facilitate active reading.

SUMMARY

There is a need for a document review system to provide a fluid-like environment in which users can freely and flexibly manipulate, rearrange, and annotate documents without many of the restriction inherent in paper. It is to such systems and related methods that various embodiments of the present invention are directed.

Briefly described, various embodiments of the present invention are review systems and methods for facilitating active reading of documents, by providing a fluid-like interface with advantages over physical paper and conventional word processing systems. According to embodiments of the present invention, a document review system can provide a novel approach to representing and interacting with documents. In contrast to the paper model, which offers a stable but rigid representation, the document review system can provide a highly flexible, malleable document representation. The document review system can provide high degree-of-freedom ways to navigate through and manipulate the document representation, control what document content is displayed and where, and create annotations and other structures related to the document. To this end, the document review system can include a multi-touch, gesture-based user interface.

Earlier work has shown that active reading involves four core processes: annotation, content extraction, navigation, and layout. Embodiments of the document review system can provide improvements, as compared to paper and conventional word processing, to each of these processes. Annotation can be generally defined as text embellishment, including highlighting and marginalia. The review system can provide efficient annotation by enabling convenient switching between annotation tools, by supporting idiosyncratic markings, and by providing a convenient means for retrieving annotations made previously. Content extraction generally includes copying or moving content from a document to a secondary location, such as when outlining or note-taking. In an exemplary embodiment, the review system can closely integrate extraction with the reading process, so that user can organize and view extracted content, as well as link extracted content back to the original document. Navigation generally entails moving throughout a document and between multiple documents, such as when searching for text, turning a page, or flipping between selected locations for comparison. The review system can support bookmarks and parallelism to facilitate these or other navigational tasks. Layout generally refers to the visual or spatial arrangement of the document and related objects. The review system can optimize layout according to the user's preferences by enabling distinct portions of the document to be viewed in parallel, while maintaining the document's linearity.

More specifically, in an exemplary embodiment, a document review system can comprise a virtual workspace, a document view region, a preview region, and optional document objects. The system can be embodied in one or more computer-readable media and can be executable by one or more computer processors on a computing device. The computing device can comprise a multi-touch interface by which a user can interact with the virtual workspace and the overall document review system.

The virtual workspace can be a working environment in which the user can review a document. The virtual workspace can be, for example, a graphical user interface displayed in a virtual window or frame viewable through the multi-touch interface. In an exemplary embodiment, the virtual workspace can be designed to look and feel like a physical desktop or other physical workspace to which the user may be accustomed. The virtual workspace can be a relatively unstructured environment, enabling users to place the document objects as desired throughout the virtual workspace.

The document view region can be contained fully or partially within the virtual workspace. When a user opens one or more document in the workspace, at least part of the documents can be displayed in the view region. In an exemplary embodiment, the view region can be configured to display a viewable portion of at least one document at a size that enables a user to easily read the text of the document. The size of the document in the view region can, however, be increased or decreased as the user desired. If the document is too long to be contained fully within the view region at a given magnification state of the document, then only a portion of the document can be viewable in the view region. The document can be displayed in a continuous layout, and in an exemplary embodiment, page breaks in the document can be hidden, so that the document appears to be seamless and unbounded by pagination.

Like the document view region, the preview region can be contained fully or partially within the virtual workspace. The preview region can display a larger portion of the document, at a smaller size, than the view region. In an exemplary embodiment, the magnification of the preview region can be such that the entire document can be displayed continuously in the preview region. Alternatively, however, the magnification can be such that the general layout of the document can be determined by the preview region, although the text of the document need not be readable within the region. The preview region can be linked to the document view region and can serve various navigational or other purposes. For example, and not limitation, when a user touches a point in the document within the preview region, the portion of the document displayed in the document view region can change, so as to center in the document view region the portion of the document touched in the preview region. Thus, the preview region can be utilized to select a portion of the document that is displayed in the document view region.

The document objects can be moveable objects positioned throughout the virtual workspace as desired by the user. In some embodiments, however, such movement can be restricted to areas outside of one or both of the document view region and the preview region, so as not to obstruct these regions. A document object can be created by the user to assist the user in actively reading of the document. For example, and not limitation, the user can create an excerpt of the document or an annotation, either of which can be encapsulated in a document object, which may be smaller and more easily manipulable than the document as a whole. Once created, the document object can be freely moved about the virtual workspace, so as to enable the user to arrange the virtual workspace in a manner that creates a customized active reading experience. The document object can be linked to the portion or portions of the document to which the document object relates. For example, the document object can include a visual link, such as an arrow, that the user can touch to cause the one or more documents in the document view region to shift position, thus bringing the related portions into view.

The document review system can thus enable users to manipulate documents in a way that improves upon paper and other document manipulation systems. Other objects, features, and advantages of the review system, will become more apparent upon reading the following specification in conjunction with the accompanying drawing figures.

BRIEF DESCRIPTION OF THE FIGURES

FIGS. 5A-5B illustrate collapsing of a document, according to an exemplary embodiment of the present invention.

FIGS. 7A-7B illustrate an annotation of the review system 100, according to an exemplary embodiment of the present invention.

DETAILED DESCRIPTION

Figure 1:
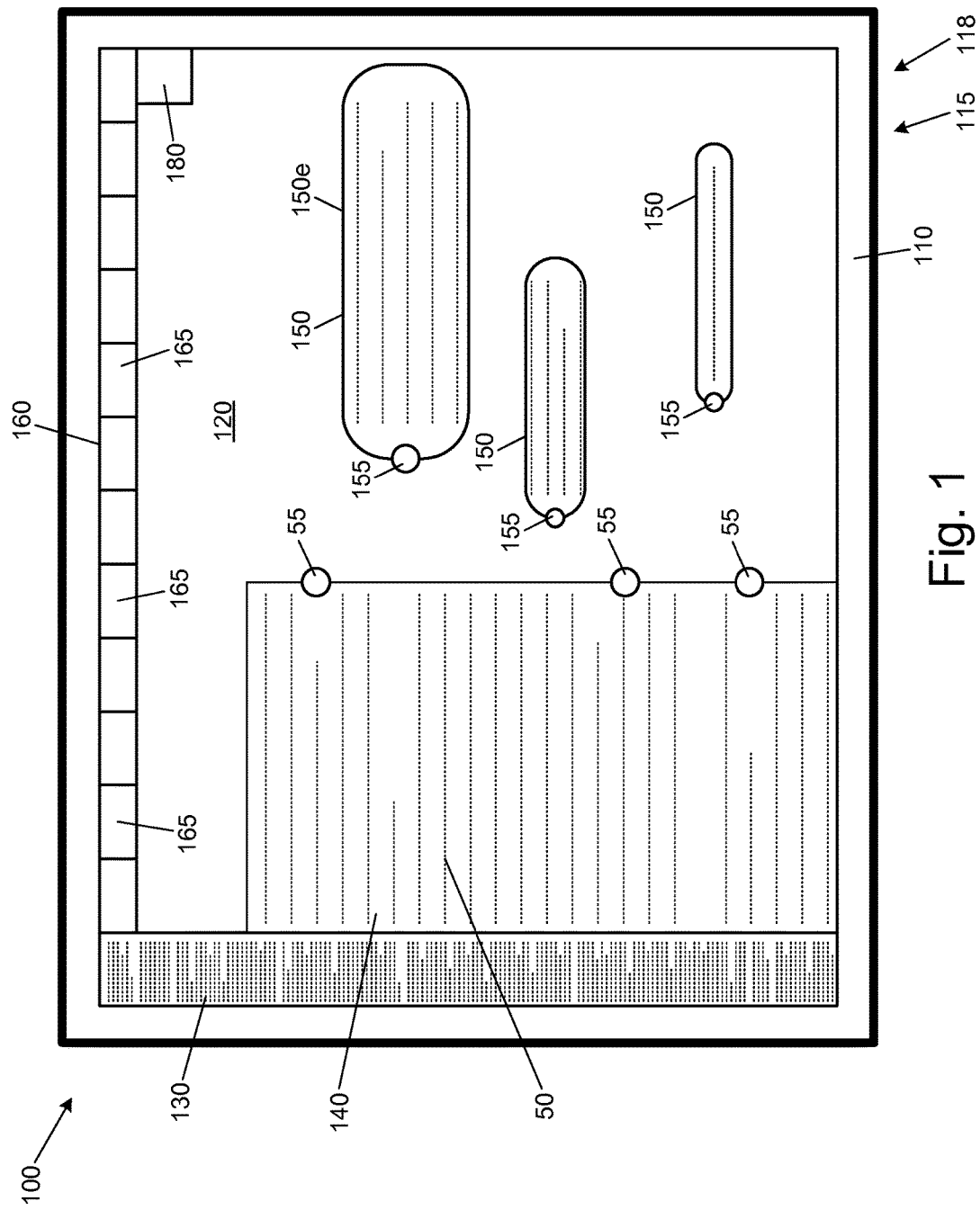
FIG. 1 illustrates a review system, according to an exemplary embodiment of the present invention.

To facilitate an understanding of the principles and features of the invention, various illustrative embodiments are explained below. In particular, the invention is described in the context of being a review system enabling a user to interact with documents in a fluid-like environment, thus facilitating active reading. Embodiments of the invention, however, are not limited to this context. Rather, embodiments of the invention can provide a freeform, fluid-like environment for performing a variety of tasks.

The components described hereinafter as making up various elements of the invention are intended to be illustrative and not restrictive. Many suitable components that can perform the same or similar functions as components described herein are intended to be embraced within the scope of the invention. Such other components not described herein can include, but are not limited to, similar or analogous components developed after development of the invention.

Various embodiments of the present invention are review systems to facilitate active reading. Referring now to the figures, in which like reference numerals represent like parts throughout the views, various embodiment of the review system will be described in detail.

FIG. 1 illustrates a review system 100, or document review system, according to an exemplary embodiment of the present invention. In an exemplary embodiment, the review system 100 can comprise, for example, a touchscreen input device 110 of a computing device 200, a virtual workspace 120, a document view region 130, a preview region 140, an optional one or more document objects 150, and a toolbar 160.

The touchscreen input device 110 can be a multi-touch input device for interfacing with the virtual workspace 120 and other aspects of the review system 100. In an exemplary embodiment, the touchscreen input device 110 is a multi-touch device capable of receiving multiple simultaneous touches, thus enabling a user to interact with the review system 100 in a natural manner, using multiple hands and fingers simultaneously. A detection system 115 can be integrated with or in communication with the touchscreen input device 110, to detect user interactions with the touchscreen input device 110. These user interactions, or gestures, can be interpreted as commands to the review system 100. Instead of a touchscreen input device 110, the review system 100 can alternatively comprise some other multi-point, bimanual, spatial input device capable of receiving a wide away of gestures interpretable as commands.

The review system 100 can be designed to improve four major processes that occur in active reading: annotation, content extraction, navigation, and layout. Conventional paper-like approaches fall short in facilitating these processes because of their fixed structure and lack of flexibility. Utilizing a multi-touch input device 110 can provide parallel and bimanual input, which are important parts of paper-based reading, and which also enable a flexible environment. A mouse, as used in most computer-based reading systems, is an inefficient control device because it provides only a single indicator or selector. A keyboard, also used in most computer-based reading systems, lacks a natural spatial mapping. The flexible interactions made possible by embodiments of the review system 100 inherently offer more degrees of freedom than traditionally offered by computer-based reading systems. Controlling these interactions with a mouse or a keyboard would be highly inefficient, requiring numerous sequential inputs to create a single command. In contrast, the multi-touch input device 110 can support multi-point spatial input and is thus capable of efficiently receiving a wide array of gestures for interacting with the review system 100.

As used through this disclosure, the terms "touch," "hold," and the like need not refer only to physical contact between the user and the touchscreen input device 110. Such terms can refer to various interactions simulating a physical contact, such as pointing from a distance or bringing a finger, hand, or implement in close proximity to the touchscreen input device 110, so as to indicate a virtual touching, holding, or the like. The definition of a "touch" can be implementation-dependent, wherein the type of touchscreen input device 110 used can determine how interactions are detected and thus how a "touch" or "hold" is defined. For example, and not limitation, the touchscreen input device 110 can utilize resistive, capacitive, or camera technologies. If, for example, camera technology is used, then a "touch" can be defined based on camera sensitivity, or on an instrument's being within a predetermined distance from the touchscreen input device 110. Additionally, "touch," "hold," and like terms need not refer only to interactions between the user's hands or fingers and the touchscreen input device 110, but can also refer to interactions with an instrument held by the user, such as a stylus, marker, or pen.

A display system 118 can be in communication with the detection system 115, the touchscreen input device 110, or both. The display system 118 can react to user gestures by displaying and refreshing a graphical user interface presented to the user, preferably through the touchscreen input device 110, which can perform as both an input and an output device. This graphical user interface can include the virtual workspace 120, the review region 130, the document view region 140, and the document objects 150, all of which will be described in more detail below.

The virtual workspace 120 can be accessible and manipulable through the touchscreen input device 110. The virtual workspace 120 can simulate a physical desktop, in that the user can freely move document objects 150 throughout the workspace 120 without being bound by a fixed structure common in computer-based reading system. In some exemplary embodiments, the virtual workspace 120 can contain the preview region 130 and the document view region 140. In other embodiments, however, the virtual workspace 120 can comprise the useable space of the review system 100 outside of the preview region 130 and the document view region 140.

When an application embodying the review system 100 is first opened, the review system 100 can present the user with the virtual workspace 120 containing a document 50, or configured to display a yet-to-be-opened document 50. Throughout the active reading process, the user can control the document 50 and other document objects 150 in the virtual workspace 120 with a vocabulary of multi-touch gestures. Through these gestures, the user can navigate, annotate, and manipulate the virtual workspace 120, rarely having to explicitly select tools or otherwise shift attention away from the document 50 at hand. Some basic interactions can be performed in the virtual workspace 120 as one might expect based on conventional touch applications. For example, objects can be repositioned by dragging the objects about the virtual workspace 120. Rescaling can be performed by a pinching or stretching gesture with two fingers, preferably in a horizontal orientation. Other performable gestures and operations, however, are new to the review system 100, as will be described below in detail.

The user can open a document 50 in the virtual workspace 120, and the open document 50 can be displayed in the one or both of the preview region 130 and the document view region 140. Throughout this disclosure, various actions are described as being performed or performable on the "text" of the open document 50. It will be understood, however, that all or most of such actions can similarly be performed on imbedded objects in the document 50 that are not text, such as images or multimedia. Thus, the term "text" throughout this disclosure is used for illustrative purposes only and is not restrictive.

The preview region 130 can be configured to display the document 50 at a magnification or size that enables the user to view the general layout of the document 50. In an exemplary embodiment, the entire document 50 can be viewable in the preview region 130, so as to present the general layout of the entire document 50 to the user. In some other embodiments, however, the magnification of the preview region 130 can be adjustable, so that the user can select a magnification size that is best suited to the user's needs.

The document view region 140 can display at least a portion of the open document 50. In an exemplary embodiment, the document view region 140 can display the document 50 at a magnification or size enabling the user to easily read the text of the document 50. In a further exemplary embodiment, the magnification of the document 50 in the document view region 140 can be modified by the user to enable to user to select a text size best suiting the user's needs.

The text of the document 50 can, in either or both of the preview region 130 and the document view region 140, be presented to the user in a continuous format, with or without pagination. If pagination is provided, then this provision can be for the user's reference only and need not restrict operations of the review system 100 to page boundaries. Some embodiments of the review system 100 can enable the user to select whether pagination is shown, to further customize the user's active reading experience. In the document view region 140 and in the preview region 130, if the entire document 50 is not visible, then the user can scroll vertically in the respective region 140 or 130 to adjust the visible portion of the document 50. Scrolling can occur when the user performs a predetermined gesture, such as touching the representation of the document 50 and, while maintaining contact with the touchscreen input device 110, sliding the fingers upward or downward. Sliding downward can cause the document 50 to move downward, thus displaying a previously invisible portion above the previously displayed portion of the document 50. Analogously, sliding upward can cause the document 50 to move upward, thus displaying a previously invisible portion below the previously displayed portion of the document 50.

The review system 100 can also support "fast scrolling" in the preview region 130, the document view region 140, or both. Scrolling at normal speed can occur as described above, in which case the displayed portion of the document 50 can be adjusted up or down corresponding to the distance the user's finger slides while in contact with the touchscreen input device 110. For example, and not limitation, with normal scrolling, the document 50 can be moved by a distance equivalent to the distance moved by the user's finger while the user's finger is holding the touchscreen input device 110. While normal scrolling is thus an intuitive means to navigate a document, normal scrolling can be inefficient for long document, when the user seeks to navigate between portions of the document 50 separated by a great distance.

To provide a more efficient scrolling mechanism, the review system 100 can also support fast scrolling, which can take advantage of modern touch sensors. In some embodiments, the review system 100 can detect an amount of pressure, a number of fingers used, or an area of contact for a touch performed in a scrolling gesture. The review system 100 can provide fast scrolling in response to, for example, increased pressure, increased number of fingers, or increased contact area of a touch. For example, if the user drags the document 50 with a light touch, the movement of the document 50 in response can simply follow the finger, resulting in normal-speed scrolling. In contrast, if a firmer touch is used, then the movement of the document 50 can correspond to the pressure of the user's touch. The document 50 can move in the same direction as the finger, but at a speed corresponding to the pressure applied by the user, where increased pressure corresponds to increased speed and distance, and where decreased pressure corresponds to decreased speed and distance. For example, if the user drags his or her finger over a distance of one inch, the document 50 can move by one, two, three, or six inches, depending on how hard the user presses the touchscreen input device 110. Analogously, the review system 100 can decrease scrolling speed in response to, for example, decreased pressure, decreased number of fingers, or decreased contact area of a touch in a scrolling gesture.

The document objects 150 can be objects created by the user to facilitate the user's active reading process. For example, and not limitation, a particular document object 150 can be created by the user, with tools of the review system 100, to represent and include an excerpt or annotation of the document 50. The document object 150 can contain text, an image, or another annotation or portion of the document 50. The document object 150 can also comprise a link to the portion of the document 50 to which the document object 150 refers. For example, and not limitation, an excerpt can contain a link back to the portion of the document 50 from which the excerpt was extracted. The link 155 can have a visible representation, such as an arrow, which can point from the document object 150 to the document view region 140 to indicate that the linked portion of the document 50 can be displayed in the document view region 140. When the user selects the link 155, the document 50 in the document view region 140 can automatically scroll to display the portion of the document 50 referred to by the document object 150. In an exemplary embodiment, selecting the link can cause the referred-to portion to be centered within the document view region 140. Selection of the link 155 can occur when the user touches the visible representation of the link 155. Various types and uses of the document objects 150 will be described in more detail later in this disclosure.

Figure 2:
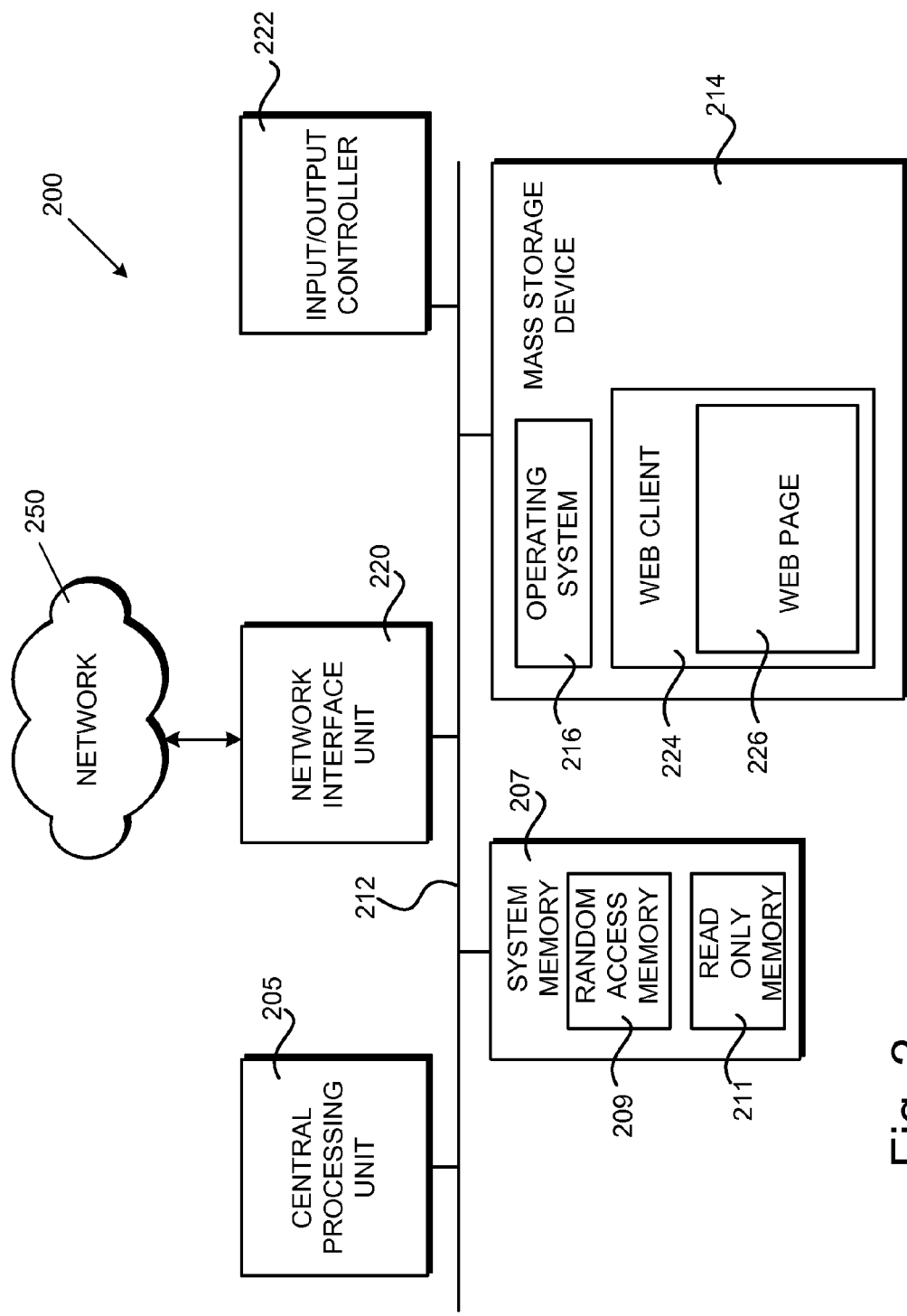
FIG. 2 illustrates an architecture of a computing device for providing the review system, according to an exemplary embodiment of the present invention.

The review system 100 can be embodied in a computer-readable medium and executed by a computer processor to provide one, some, or all aspects of the invention. For example, the review system 100 can be integrated into a computing device 200, such as by being embodied in a software application installed on the computing device. FIG. 2 illustrates an architecture of an exemplary computing device into which the review system 100 can be integrated. Those skilled in the art will recognize that the general architecture described with reference to FIG. 2 is for example only, and can be modified to accommodate various embodiments of the review system 100 and particular operational environments.

Architecturally, the review system 100 can be built on a custom, general-purpose, "query-based," touch processing system. An implementation of the review system 100 can be based on the recognition that touch input relevant to an operation might not be directed at the object of that operation. For example, holding a finger on a document 50 might mean the user wishes to drag the document 50, or it might mean the user wishes to keep the region under the user's finger from moving. More generally, with arbitrary numbers of fingers on the touchscreen input device 110, the review system 100 should be able to determine which gesture is indicated by the current number and arrangement of fingers.

As shown in FIG. 2, a computing device 200 embodying the review system 100 can comprise a central processing unit 205 and one or more system memories 207, such as a random access memory 209 ("RAM") and a non-volatile memory, such as a read-only memory ("ROM") 211. The computing device 200 can further comprise a system bus 212 coupling together the memory 207, the processing unit 205, and various other components. A basic input/output system containing routines to assist in transferring information between components of the computing device 200 can be stored in the ROM 211. Additionally, the computing device 200 can include a mass storage device 214 for storing an operating system 216, application programs, and other program modules.

The mass storage device 214 can be connected to the processing unit 205 through a mass storage controller (not shown) connected to the bus 212. The mass storage device 214 and other computer-readable media can comprise computer storage media, which can include volatile and non-volatile, removable and non-removable media implemented in any method or technology for storage of information, such as computer-readable instructions, data structures, program modules, or other data. Computer storage media includes, but is not limited to, RAM, ROM, EPROM, EEPROM, flash memory, other solid state memory technology, CD-ROM, digital versatile disks ("DVD"), other optical storage, magnetic cassettes, magnetic tape, magnetic disk storage, other magnetic storage devices, or various other media used to store data accessible by the computing device 200.

A number of program modules and data files can be stored in the computer storage media and RAM 209 of the computing device 200. Such program modules and data files can include an operating system 216 suitable for controlling operations of a networked personal computer. A web browser application program, or web client 224, can also be stored on the computer storage media and RAM 209. The web client 224 may comprise an application program for requesting and rendering web pages 226 created in Hypertext Markup Language ("HTML") or other types of markup languages. The web client 224 can be capable of executing scripts through the use of a scripting host. The scripting host executes program code expressed as scripts within the browser environment.

Computer-readable instructions on the storage media of the computing device 200 can include, for example, instructions for implementing processes of the review system 100 or for implementing a web client 224 for receiving instructions from the review system 100 when operated remotely. These instructions can be executed by the computer processor 205 to enable use of the review system 100.

The computing device 200 can operate in a networked environment using logical connections to remote computers over a network 250, such as the Internet. The computing device 200 can connect to the network 250 and remote computers through a network interface unit 220 connected to the bus 212.

The computing device 200 can also include an input/output controller 222 for receiving and processing input from a number of input devices, including a keyboard, mouse, or electronic stylus. Interactions between the input devices and the review system 100 can be detected by the input/output controller 222 to provide meaningful input to the computing device 200. The input/output controller 222 can additionally provide output to a display screen, a printer, or other type of input/output device, such as the multi-touch input device 110 or other appropriate input device of the review system 100.

The hardware and virtual components described above can work in combination to provide various aspects and operations of the review system 100, as will be described in detail below.

The review system 100 can provide various mechanisms by which the user can navigate the document 50 and modify the layout of the document 50 for the user's convenience during active reading. For example, dog-earing or bookmarking can be supported in a manner that is more convenient than in conventional computer-based systems. In conventional systems, bookmarking is supported by navigating to a desired page, selecting a bookmark icon or menu item, and then typing a name for the bookmark. Later, when the user wishes to return to a bookmarked location, the user can select the bookmark that was created. And when the bookmark is no longer needed, the user must explicitly delete the bookmark to remove it from the document. This bookmarking process is inconvenient and time-consuming in situations where a user intends to create only a temporary bookmark, to facilitate flipping between sections for comparison. When a user desires simply to compare two or more sections of a document, the user must bookmark each section and cycle through the bookmark links to flip between the bookmarked sections.

Figure 3:
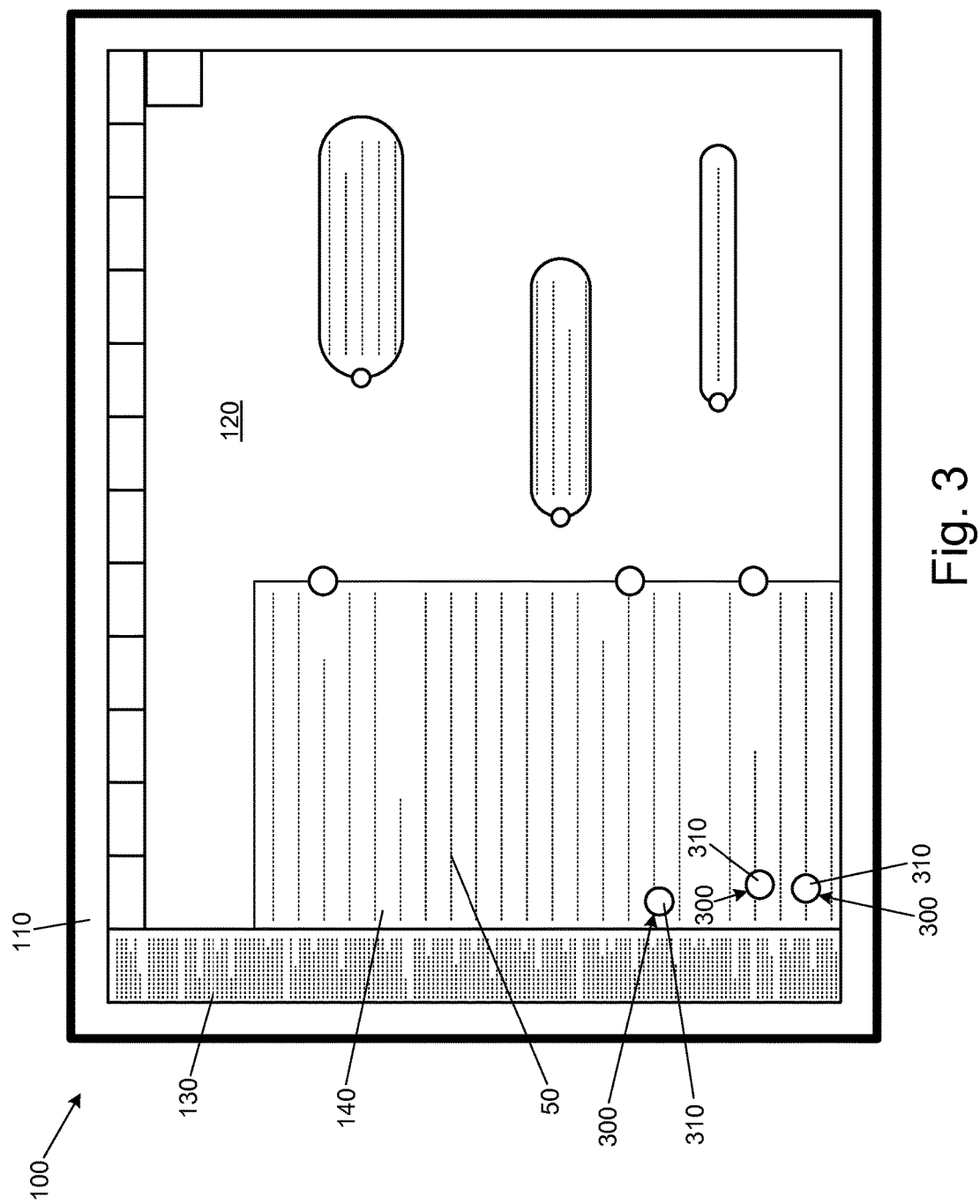
FIG. 3 illustrates a transient bookmark of the review system, according to an exemplary embodiment of the present invention.

FIG. 3 illustrates the use of transient bookmarks 300 in the review system 100, according to an exemplary embodiment of the present invention, which are an improvement over bookmarking in conventional computer-based systems. Through transient bookmarking, the review system 100 can provide a much more convenient means of bookmarking, analogous to dog-earing and simply holding one's place in a book with a finger.

In the document view region 140 of the review system 100, the user can perform a gesture to create a transient bookmark 300, which can be recalled by a later gesture. For example, the user can simply touch and hold a finger to the document 50 as the user navigates through the document 50. In some exemplary embodiments, a touch and hold can be interpreted as transient bookmarking only when occurring in a predetermined area of the document view region 140, such as near the left edge. This need not be the case, however, and in some other embodiments, the touch and hold can occur anywhere on the document 50 to create a transient bookmark 300.

The touch and hold can indicate to the review system 100 that the user is holding the currently visible place in the document 50, as the user continues to scroll through or otherwise navigate the document 50 in the document view region 140. Additional fingers can touch and hold on the document 50, next to the first finger, to indicate other transient bookmarks 300 within the document 50, as navigation continues. When a finger touches and holds to create a transient bookmark 300, a graphical representation 310 or link of the bookmark 300, such as an orb, an arrow, or an icon of a bookmark 300, can be created where the user touches.

When the user desires to return to a marked document position, the user can simply lift the finger corresponding to the desired position of the document 50 and then replace the finger again within a predetermined time period. In response to the lifted and replaced finger, the document 50 in the document view region 140 can automatically scroll to display the portion of the document 50 that was visible when the finger originally touched down to create the virtual dog-ear or bookmark 300. If the user leaves his or her finger up after lifting it, instead of replacing the finger, the transient bookmark can disappear and be automatically deleted after the predetermined time period, such as several seconds. Replacing the finger on the document 50, or on the graphical representation 310 of the bookmark 300, within the predetermined time period can cause the review system 100 to continue saving, or resave, the bookmark 300. Accordingly, by placing and alternately lifting two or more fingers, the user can mark and switch between positions in the document 50. The user need not waste time naming or deleting bookmarks 300, but can thus create transient bookmarks 300 by simply touching and holding the document 50.

Further, as a benefit over both paper and conventional computer-based systems, a transient bookmark 300 can save and restore a state of the virtual workspace 120 or of the document view region 140, as opposed to merely a position within the document 50. In some embodiments, a transient bookmark 300 can save the current layout of the document 50 or the current layout of the entire virtual workspace 120. For example, and not limitation, if a portion of the document 50 includes highlighting or is collapsed, as will be described further below, these aspects of the document layout can be restored when a transient bookmark 300 is recalled, such as by the user's lifting a finger. For another example, a bookmark 300 can capture the placement of document objects 150 or the magnification and rotation of the document view region 140 and document objects 150. Thus, by using transient bookmarks 300 in the review system 100, the user can rapidly flip between and discard layout states by placing, lifting, and moving fingers.

Figure 4:
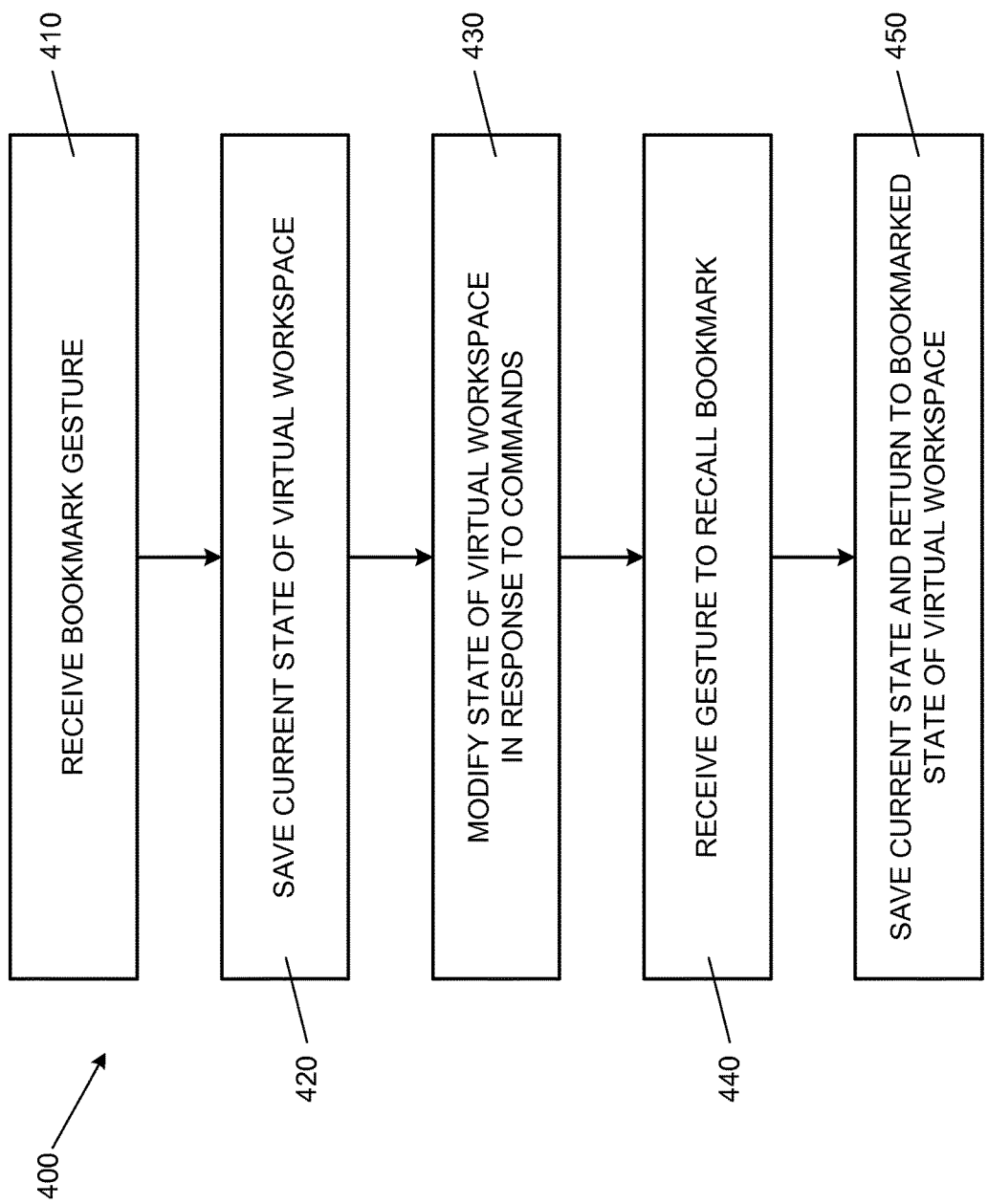
FIG. 4 illustrates a flow diagram of a method of creating a transient bookmark, according to an exemplary embodiment of the present invention.

FIG. 4 illustrates a flow diagram of an exemplary method 400 of providing a transient bookmark 300, according to an exemplary embodiment of the present invention. The method 400 depicted in this FIG. 4 is provided for illustrative purpose and is not limiting, and other methods toward a similar end can also be implemented. As shown in the illustrated method 400, at 410 the review system 100 can receive a transient bookmark 300 gesture, such as a touch and hold in the document view region 140. At 420, in response to the bookmarking gesture, the review system 100 can save the current state of the virtual workspace 120. At 430, the review system 100 can then receive one or more other commands resulting in a change in the state of the virtual workspace 120. For example, and not limitation, the user can continue to navigate the document 50, thus changing the portion of the document 50 displayed in the document view region 140. At 440, the review system 100 can receive a recall gesture for the bookmark 300, such as the user's releasing from the document view region 140 a finger corresponding to the bookmark 300 and then quickly replacing the finger. In response to this recall gesture, at 450, the review system 100 can save the current state of the virtual workspace 120 and return the virtual workspace 120 to the previous state to which the bookmark 300 corresponds. Thus, the method 400 of FIG. 4 results in creation and use of a transient bookmark 300 in the review system 100.

Another tool provided by the review system 100 is collapsing, which is not efficiently provided in either paper or conventional computer-based systems. The review system 100 seeks to treat a document 50 in a fluid manner, instead of as a rigid structure. Collapsing is a tool to that end, enabling a user to focus on important parts of the document 50 in the context of the document's original layout, without being distracted by less important portions of the document 50. In essence, collapsing is a process of squishing, minimizing, or squeezing an intermediate portion of the document 50, so as to bring together two portions of the document 50 separated by that intermediate portion.

Figure 5B:
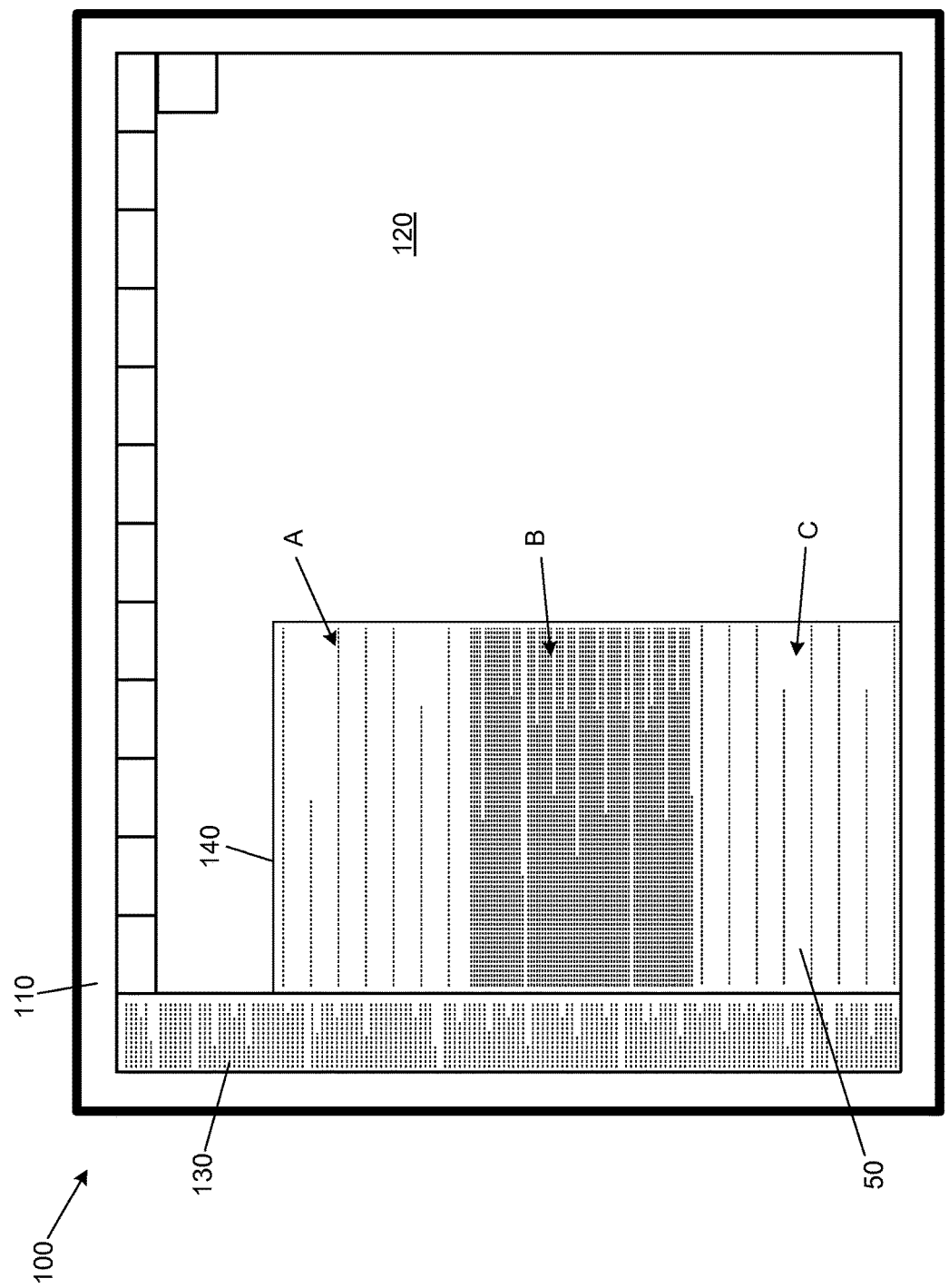

FIGS. 5A-5B illustrate an example of collapsing a document 50, where FIG. 5A shows the document 50 in an uncollapsed state, and FIG. 5B shows the document 50 after being collapsed. As shown by comparing FIGS. 5A and 5B, an intermediate section C of the document 50 can be collapsed to bring separate sections A and C closer together. Although in FIG. 5A, the distinct sections A and C of the document 50 were both simultaneously viewable in the document view region 140 even before collapsing, this need not be the case. In some instances, a first section A may be far removed from a second section C within the document 50, such that both sections would not be simultaneously viewable in the document 50 at a readable magnification, without collapsing the document 50.

The review system 100 can collapse the document 50 in response to a collapse gesture received from the user. In some embodiments, the collapse gesture can be a pinching gesture, whereby the user places two fingers, usually a thumb and forefinger, on the touchscreen input device 110, and then moves the fingers closer together while maintaining the touch, thus creating a pinching motion. Pinching to initiate collapsing is intuitive because it corresponding to simultaneously scrolling in two directions, where the top finger of the pinch scrolls downward, while the bottom finger scrolls upward. As a result of this opposite-direction scrolling, the document 50 is collapsed.

As mentioned above, magnification of the document view region 140 can also be adjusted with a pinching motion. The gestures indicating collapse and magnification can be distinguished based on orientation of the pinching. For example, and not limitation, magnification can be initiated by a horizontal pinching gesture, while collapsing can be initiated by a vertical pinching gesture.

A subtlety of the pinching gesture, in those embodiments where it is used, is that the user can control many aspects of the collapse process by the manner of pinching. For example, and not limitation, if the user moves his or her top finger toward the bottom finger, then the portion of the document 50 below the fingers can remain stationary while the part above the fingers can move and collapse downward. Analogously, if the user moves his or her bottom finger while leaving the top finger stationary, the reverse can occur. If the user moves both fingers toward each other, then both the above and below portions of the document 50 can move toward each other and collapse together in the process. Further, the distance by which the user moves his or her fingers can control how much of the document is collapsed.

Therefore, the user can perform a complex command, with many degrees of freedom, by way of a one-hand movement.

In addition, or alternatively, to the vertical pinching gesture, one or more other gestures can also be interpreted as a collapse command. For example, a collapse gesture performed on the preview region 130 can be used to initiate collapsing. When the user touches and holds on a first section A of the document 50 within the preview region 130, and while holding the first section A, the user also touches a separate second section C also in the preview region 130, the review system 100 can interpret such touching as a collapse gesture. Yet another collapse gesture can comprise the user's touching and holding a first section A of the document 50 in the document view region 140 and then touching a second section C in the preview region 130, or the user can touch and hold the first section A in the preview region 130 and then touch the second section C in the document view region 140.

In response to one or all of the above collapse gestures, the review system 100 can automatically collapse the document 50 and, more specifically, can collapse the intermediate section B between the separate sections A and C that were touched by the user in the preview region 130 or the document view region 140. Performing a version of the collapse gesture, on the preview region 130, can be particularly useful when the sections A and C that the user desires to bring closer together are separated by a large amount of space within the document 50. In that case, when a large intermediate section B of the document 50 needs to be collapsed, pinching can become time-consuming. Thus, the preview region 130 can be used to initiate collapsing in an efficient manner.

Collapsing can provide a number of benefits to the user during active reading. As shown in FIG. 5B, collapsing can enable the user to simultaneously view two distinct sections of the document 50 while retaining the linearity of the document 50 and the context of the two sections A and C. For example, although a portion of the intermediate section B between the distinct sections A and C may not be readable after collapsing, some of the intermediate section B can remain readable, so as to enable the user to see the context of the two sections A and C brought closer together by the collapsing. Retaining the document's linearity can be beneficial to the user because it can enable the user to maintain awareness of where he or she is within the document 50 and, thus, to maintain awareness of the general flow and organization of the document 50. Additionally, because the collapsed portion is still visible to the user, although not necessarily readable, collapsing can provide the user with a visual cue as to the amount of text lying between the two distinct sections A and C of the document 50.

It will be understood that collapsing within a single document 50 need not be limited to bringing two sections closer together. Rather, collapsing can also be used to reduce the distraction caused by multiple unimportant sections. Further, multiple collapsed sections can be present within the document 50 simultaneously, so as to enable the user to modify the spatial arrangement of the document 50 and view only the sections of the document 50 that hold interest for the user, while collapsing less interesting sections, maintaining the linearity of the document 50, and enabling the user to view the context of the sections that remain readable.

The review system 100 can uncollapse a portion of collapsed text upon receiving an uncollapse gesture. In an exemplary embodiment, for example, an uncollapse gesture can comprise the user's brushing or swiping a hand or finger upward or downward across the collapsed portion. An upward swipe can cause the review system 100 to uncollapse the document 50 upward, so as to maintain the bottom position of the collapsed portion upon uncollapsing. Analogously, a downward swipe can initiate a downward uncollapsing.

Another important aspect of active reading is text selection and emphasis. The user may wish to emphasize, extract, or otherwise manipulate portions of the document 50. In order for such manipulation to occur, however, the user can sometimes be required first to select the portion of the document 50 to be manipulated. Thus, the review system 100 can provide a means for selecting text in a document 50.

The review system 100 can select a block of text in the document 50, preferably displayed in the document view region 140, in response to receiving a selection gesture from the user. In an exemplary embodiment, the selection gesture can comprise the user's touching a forefinger and middle finger, or other detectable set of two fingers, to the touch-screen input device 110 over the document view region 140, where the forefinger is positioned just below the starting point of the intended selection area in the document 50. The user can remove the middle finger and, while maintaining the touch of the forefinger, slide the forefinger to the end of the text to be selected. Then the user can remove the forefinger to end the touch.

The review system 100 can interpret the above, or some other, selection gesture as a command to select the text between the start and end points of the touch. To confirm that the indicated text was selected, the review system 100 can temporarily emphasize the selected portion, such as by coloring, highlighting, underlining, or enlarging the selected portion in the document view region 140. Unlike some conventional touch-based systems, the review system 100 need not rely on dwell time to detect that a selection gesture is occurring, and the user need not hold his hand or fingers in a single position for an extended period of time in order for the selection gesture to be recognized by the review system 100.

In some embodiments of the review system 100, the user can select multiple sections of text, thus enabling the user to perform an action on the multiple selections simultaneously. The review system 100 can create multiple selections in response to a multiple-selection gesture. The multiple-selection gesture can comprise, for example, selecting a first section of text as discussed above, and then touching and holding that selected section while creating a second selection elsewhere in the document 50. Alternatively, however, the user need not hold a selected section to begin selecting other sections of the document 50. In some embodiments, for example, the review system 100 can simply detect that multiple selections are being made in sequence, and can thus retain all selections. In that case, a multiple-selection gesture can simple be a sequence of selection gestures. All currently selected portions of the document 50 can be emphasized to indicate to the user that selection was successful.

After a portion of a document 50 is selected, the user can highlight that selected portion to maintain an emphasized state of the selected text. The review system 100 can recognize a highlighting gesture performed by the user to highlight the selected or otherwise-indicated portion of the document 50. For example, and not limitation, the highlighting gesture can comprise the user's touching a highlight button 180 (see FIG. 1) in the virtual workspace 120 or on the toolbar 160 before or after completing the selection. In response to the highlighting gesture, the review system 100 can highlight the selected portion of the document 50, such as by providing a background color for the selected portion.

The review system 100 can provide the user with one or more colors with which to highlight text in the document 50. If multiple colors are available, then the user can select a desired color, and that selected color can be the active highlighting color used to highlight text when the user so indicates.

Figure 6A:
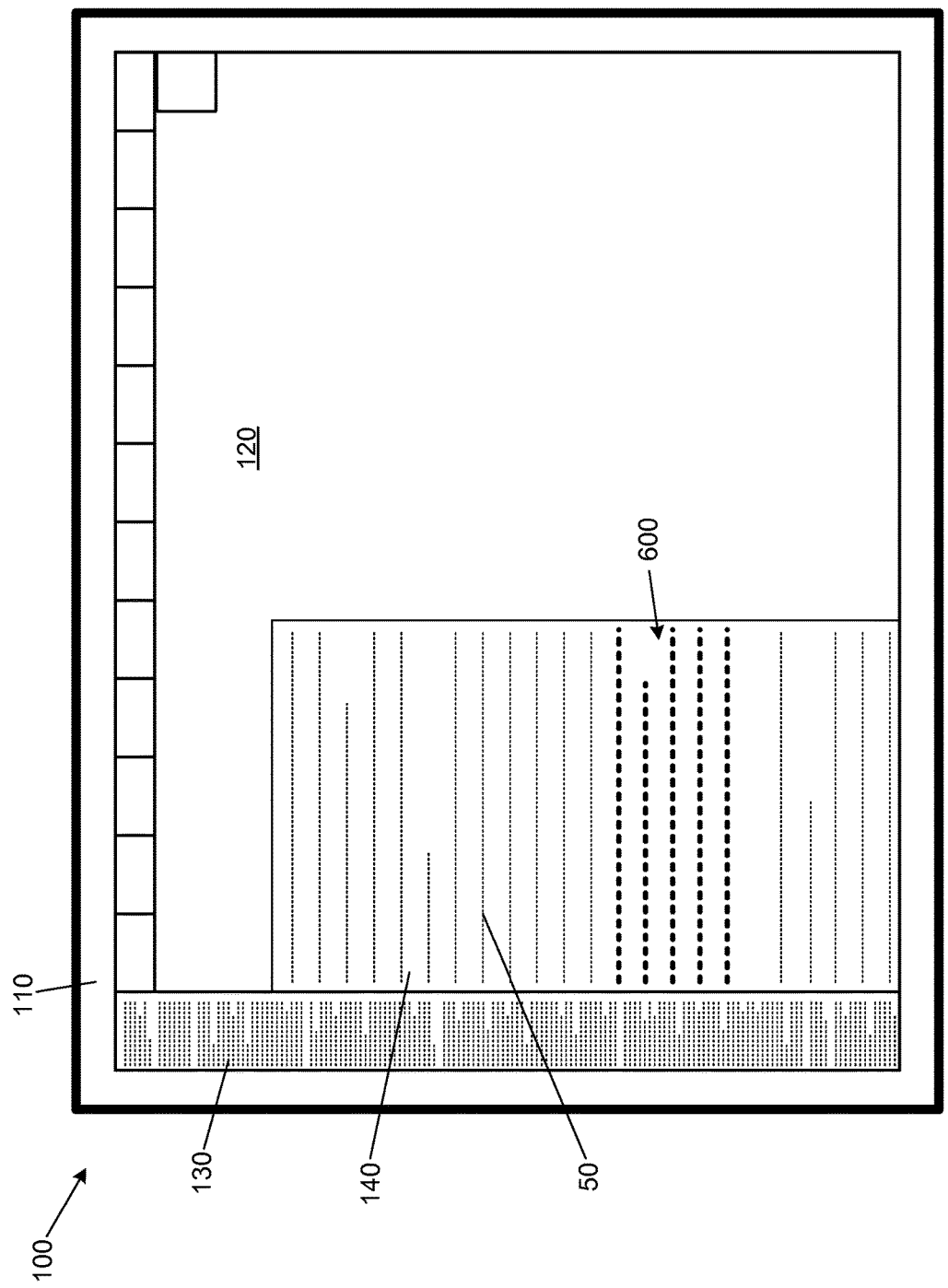
FIGS. 6A-6B illustrate an excerpt of the review system 100, according to an exemplary embodiment of the present invention.
Figure 6B:
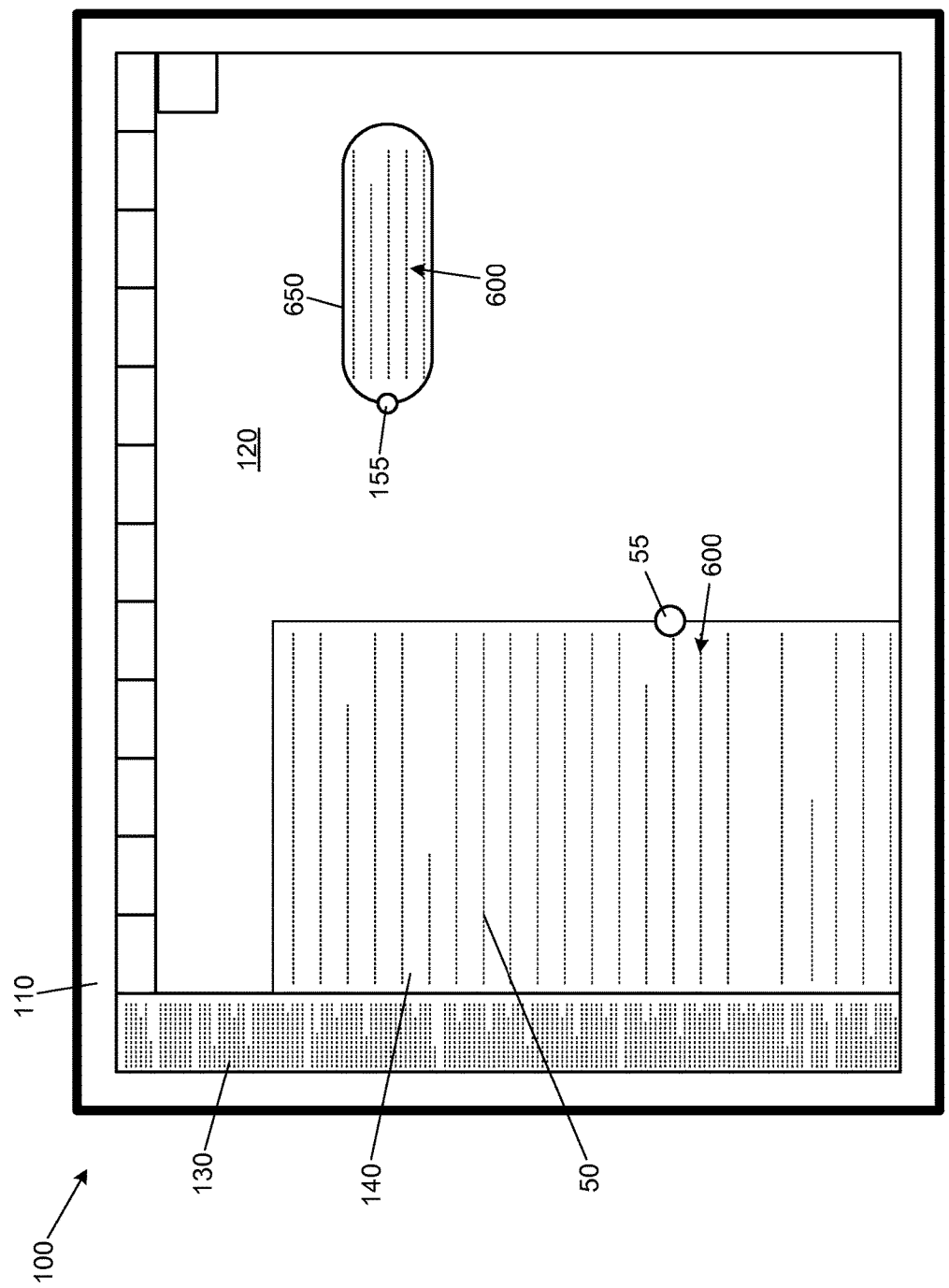

In addition to highlighting, various other tasks can be performed on a block of selected text. For example, FIGS. 6A-6B illustrate creation of an excerpt 600 in the review system 100, according to an exemplary embodiment of the present invention. More specifically, FIG. 6A illustrates a selected section of text within the document 50, and FIG. 6B illustrates the virtual workspace 120 after the selected section as been extracted into an excerpt 600.

The review system 100 can create an excerpt 600 in response to an excerpt gesture, which can comprise a selection gesture in combination with an extraction gesture. To perform the extraction portion of the gesture, the user can touch and hold the document 50 with one finger or hand, and then touch and drag the selected text from the document view region 140 into a portion of the virtual workspace 120 outside of the document view region 140. This can be an intuitive gesture, because performing the gesture simply requires the user, after initial selection, to simulate holding the document 50 in place with one hand, while dragging a portion of the document 50 away with the other hand.

Once created, an excerpt 600 can be encapsulated or embodied in an excerpt object 650, a type of document object 150 moveable throughout the virtual workspace 120. The excerpt object 650 can include the text extracted from the document 50 during the excerpt's creation. In an exemplary embodiment, this text is not removed from the document 50 in the document view region 140, but is simply duplicated into the excerpt objects 650 for the user's convenience, while maintaining the linearity and content of the document 50 in the document view region 140.

The excerpt object 650 can comprise a link 155 back to the portion of the document 50 from which it was extracted. That link 155 can have a graphical representation, such as an arrow, visible on or near the excerpt object 650 in the virtual workspace 120. When the user selects the link 155, such as by touching the graphical representation, the document view region 140 can automatically return to the portion of the document 50 referred to by the excerpt object 650. In other words, if the document view region 140 no longer displays the section of the document 50 from which the excerpt 600 was extracted, that section of the document 50 can automatically become centered in the document view region 140 when the user selects the arrow or other representation of the link 155 contained by the excerpt object 650. Thus, the user can retrieve the portion of the document 50 referred to by an excerpt object 650 by simply selecting the link 155 of the excerpt object 650.

In the document view region 140, the portion of the document 50 that was extracted to the excerpt object 650 can contain a link 55 to the excerpt object 650. Like the link 155 comprised in the excerpt object 650, the link 55 in the document view region 140 can have a graphical representation, such as an arrow. This arrow can be positioned on or near the extracted portion of the document 50 in the document view region 140. When the link 55 is selected, the excerpt object 650 referred to by the link 55 can be emphasized by the review system 100, to enable the user to locate the excerpt object 650. Emphasis can take various forms. For example, and not limitation, the excerpt object 650 can automatically be placed in front of other document objects 150 that may appear in the virtual workspace 120 and that may block the user's view of the excerpt object 650. Alternatively, for example, the excerpt object 650 can flash, change colors, or be emphasized in various other manner to enable the user to locate the excerpt object 650 as a result of the user's selection of the link 55 within the document 50. Thus, when an excerpt is created, the review system 100 can establish a pair of bidirectional links enabling the user to maintain a connection between the excerpt 600 and the portion of the document 50 from the excerpt 600 was extracted.

A large shortcoming of paper is the constraint that paper places on textual annotations, such as comments and notes. Annotations on paper must generally be fit to the space of a small margin, and are typically only able to refer to text appearing within a single page. While software products like Microsoft Word® and Adobe Acrobat® avoid some of these difficulties, these software products still largely follow paper's paradigm. As a result, annotations created by these software products are thus limited to a single referent on a single page, and the user is provided little control over the size and scale of annotations. The review system 100 can overcome these difficulties by providing a flexible visual-spatial arrangement.

Figure 7B:
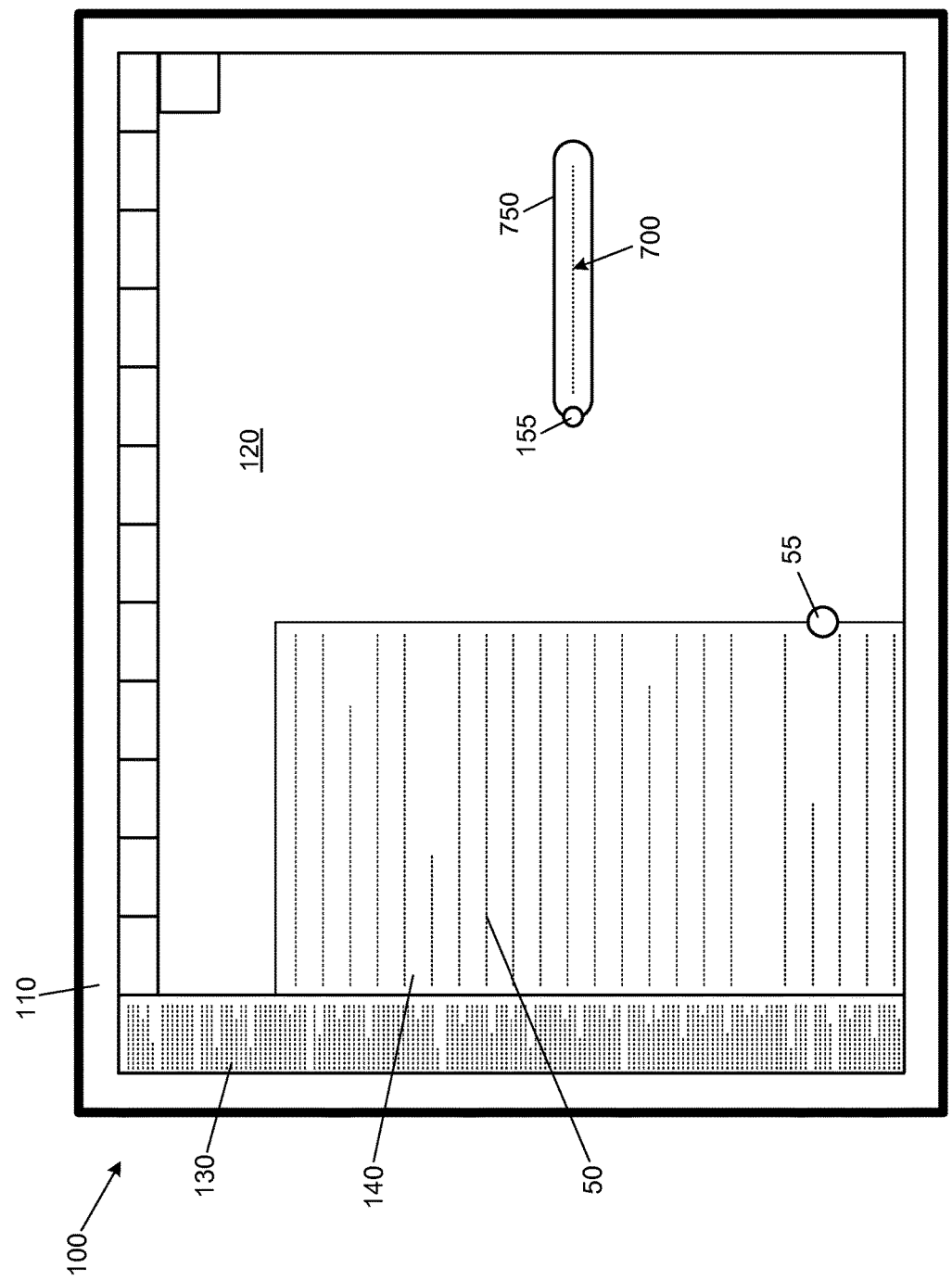

FIGS. 7A-7B illustrate creation of an annotation 700 in the review system 100, according to an exemplary embodiment of the present invention. More specifically, FIG. 7A illustrates selection of text in the document 50 to which an annotation 700 will refer, and FIG. 7B illustrates an annotation object 750 referring back to the text selected in FIG. 7A.

Creation of an annotation 700 in the review system 100 can begin with selection of text in the document 50, as displayed in the document view region 140, or with selection of text in a preexisting document object 150. After text is selected, the user can simply begin typing, or the user can select an annotation button and then begin typing. The review system 100 can then interpret the typed text as an annotation 700, which can be encapsulated in an annotation object 750, a type of document object 150. The typed input received from the user can be displayed in the annotation object 750.

In some embodiments, the annotation object 750 need not refer to only a single portion of text, in the document 50 or in another document object 150. For example, an annotation object 750 referring to multiple portions can be created when the user selects two or more sections of text, using the multiple selection gesture, and then types the annotation text. For another example, an annotation 700 can be created for multiple sections by touching and holding each intended section within the preview region 130, the document view region 140, document objects 150, or some combination of these, and then typing or selecting an annotation button.

The annotation object 750 can have many similarities to an excerpt object 650, given that both are types of document objects 150, which will be described in more detail below. For example, like an excerpt object 650, the review system 100 can create a bidirectional link between each annotation object 750 and the portion or portions of text referred to by the annotation object 750. The annotation object 750 can thus contain a link 155 back to the one or more text portions of the document 50 or other document objects 150 to which the annotation object 750 refers. That link 155 can have a graphical representation, such as an arrow, linking the annotation object 750 back to the portions of text to which the annotation 700 refers. In some embodiments, the annotation object 750 can have a separate link 155 for each portion of text to which the annotation object 750 refers, while in other embodiments, a single link 155 can be used to refer back to all of the related portions of text in the document 50 or elsewhere. When a single link 155 is used, and when the user selects the single link 155 of the annotation object 750, the document 50 can automatically collapse to simultaneously display any portions of the document 50 linked to the annotation 700, and any document objects 150 linked to the annotation object 750 can automatically move into view in front of other document objects 150 in the virtual workspace 120. Likewise, if multiple links 155 are used, the user can touch and hold multiple links 155 of an annotation object 750 to prompt the review system 100 to collapse the document 50 and recall the linked document objects 150, as needed to display the multiple linked portions of text.

Document objects 150, such as excerpt objects 650 and annotation objects 750, can be located in the virtual workspace 120 and manipulable in a manner similar to physical objects in a physical workspace. For example, and not limitation, a document object 150 can be freely moved about the virtual workspace 120 and positioned in the workspace 120 wherever the user desires. Document objects 150 can be placed over one another, so as to hide each other or to bring one document object 150 into view at the expense of the visibility of another document object 150. The size and number of document objects 150 that can be placed on the virtual workspace 120 need not have a predetermined limit, so the user can create and manipulate as many document objects 150 as the user desires to fit into the virtual workspace 120.

In some embodiments, the review system 100 can recognize a resizing gesture, such as a pinching gesture, for modifying the size of an individual document object 150. The user may desire to selectively and temporarily enlarge or shrink individual or groups of document objects 150 in the virtual workspace 120, as shown by an exemplary enlarged document object 150e in FIG. 1. The review system 100 can selectively enlarge or shrink one or more individual document objects 150 in response to the user's performance of the resizing gesture on the individual document objects 150.

As discussed above with respect to excerpt objects 650 and annotation objects 750, a first document object 150 can contain a link or links 155 to one or more portions of the document 50 or other document objects 150 associated with the first document object 150. The link 155 can be part of a bidirectional link, where the other part of the bidirectional link is associated with the document 50 in the document view region 140, or with another document object 150, and refers back to the first document object 150. Selecting a link 155 of the first document object 150 can cause the document 50 in the document view region 140 to scroll, so as to position the related portion of the document 50 at the vertical center of the document view region 140. Alternatively, if the link 155 connects to another document object 155, then when the link is selected, that other document object 150 can be automatically brought into view over other document objects 150. If multiple portions of text in the document 50 or other document objects 150 are referred to by a selected link 155, or if multiple links 155 of the first document object 150 are selected, or if multiple links 155 of multiple document objects 150 are selected, then the document 50 in the document view region 140 can collapse, scroll, or collapse and scroll as needed to simultaneously display all portions of the document 50 referred to by the links 155. Analogously, linked document objects 150 can also be brought into view as necessary to display the text referred to by the links 155.

Further analogously, if selected links 155 additionally refer to portions of a second document 50 in a second document view region 140, that second document 50 and second document view region 140 can also be modified as needed to display the text referred to by the selected links 155.

In the same or similar manner by which a document object 150 can be linked to a portion of the document 50 or to another document object 150, two or more portions of a document 50 or in different documents 50 can be linked together. A bidirectional link between two or more document 50 portions can be created in response to a linking gesture. A linking gesture can include, for example, selecting the desired document 50 portions and then touching the desired portions simultaneously. In response to this linking gesture, the review system 100 can create a bidirectional link between the selected portions of the document 50. Like the links associated with document object 150, selection of the link at one of the linked document 50 portions can automatically cause the other linked portions to come into view.

In addition to being moveable throughout the workspace 120, document objects 150 can also be attachable to one another, to enable the user to rearrange the document objects 150 and the virtual workspace 120 as needed. To attach two or more document objects 150 together, the user can touch and drag one document object 150 until it contacts another. The two document objects 150 can then be attached to each other, until the user touches both of them and drags them away from each other. In some exemplary embodiments, when a group of document objects 150 are attached together, moving a primary one of those attached document objects 150 can cause all of the attached document objects 150 to move together, maintaining their spatial relationships with one another. The primary document object 150 can be, for example, the document object 150 positioned at the highest point in the virtual workspace 120, as compared to the other grouped document objects 150. Thus, the user can group annotation 700 and excerpts 600 together into a group to assist the user in performing the organizational aspects of active reading. Further, even after grouping document objects 150 together, the user can continue to rearrange the virtual workspace 120 to best suit the user's needs.

In some other exemplary embodiments, document objects 150 within a group can have a parent-child hierarchy, where a primary document object 150, such as the highest positioned or the first to become a member of the group, can be a parent of a lower positioned or later-grouped document object 150. A parent document object 150 can control the movement of its child or children, such that when the user moves the parent document object 150, the child document object 150 automatically moves, thus maintaining its spatial relationship to its parent document object 150. In contrast, when a child document object 150 is moved, its parent need not follow. The same parent-child principles can apply to manipulations of document objects 150 other than repositioning. For example, and not limitation, resizing, and deletion can also be inherited by a child document object 150 from a parent document object 150, such that the child document object 150 can be resized, magnified, or deleted automatically along with its parent document object 150. In contrast, manipulations performed to a child document object 150 need not be inherited by a parent document object 150.

When the user seeks to exit the review system 100 but would like to retain the state of the virtual workspace 100, the review system 100 can enable the user to save the current state of the virtual workspace 120. For example, the review system 100 can export the virtual workspace 120 by printing to paper, printing to Adobe PDF, or exported to an image. For further example, the review system 100 can be associated with a proprietary document format. If the user saves the virtual workspace 120 in this format, then the user can return to the virtual workspace 120 to continue active reading in the same state in which the virtual workspace 120 was saved.

Embodiments of the review system can thus be used to facilitate active reading, by providing a fluid-like, non-rigid, reading environment customizable by a user. While the review system has been disclosed in exemplary forms, many modifications, additions, and deletions may be made without departing from the spirit and scope of the system, method, and their equivalents, as set forth in the following claims.

What is claimed is:
1. A method comprising:
    displaying a portion of a document in a document view region of a virtual workspace and displaying a preview of the document in a document preview region, wherein the document preview region is separate from the document view region and displays a representation of the document different than the displayed portion of the document in the document view region;
    receiving an extraction gesture indicating an extraction portion of the document from the displayed portion of the document and an extraction location in the virtual workspace, the extraction location being in the virtual workspace outside of the document view region;
    displaying two or more document objects in the virtual workspace, the document objects being manipulable and moveable about the virtual workspace in response to user interaction;
        wherein one of the document objects comprises a first excerpt object at the extraction location containing a duplicate copy of content extracted from the extraction portion of the document, in response to the extraction gesture; and
        wherein the first excerpt object comprises a visible link between the first excerpt object and the extraction portion of the document;
    receiving a selection of the first excerpt object;
    modifying the document view region to display the extraction portion of the document, if the extraction portion of the document is not currently displayed in the document view region, in response to the selection of the first excerpt object;
    receiving a collapse command comprising:
        selection of a first collapse object in the document view region linked to a first portion of the document; and
        while the first collapse object is selected, receiving a selection of a second collapse object in the document preview region that is linked to a second portion of the document, wherein an intermediate portion of the document is positioned between the first portion and the second portion of the document; and
    automatically repositioning in the document view region one or both of the first portion and the second portion of the document in response to the collapse command by shrinking the size of the intermediate portion of the document in the document view region such that both first and second portions are positioned to be displayed within the document view region;
    wherein the first portion and the second portion of the document are displayed closer together in the document view region after repositioning.

2. The method of claim 1, further comprising:
providing a second visible link between the first excerpt object and the extraction portion of the document;
receiving a selection of the second visible link; and
recalling the first excerpt object in response to the selection of the second visible link.

3. The method of claim 2, further comprising providing an obstructing document object positioned in the virtual workspace to obstruct the view of the excerpt object, wherein recalling the first excerpt object comprises repositioning the first excerpt object to avoid the obstruction of any visual elements in the virtual workspace.

4. The method of claim 1, further comprising performing the extraction gesture by moving the extraction portion of the document into the extraction location outside of the document view region.

5. The method of claim 1, further comprising performing the extraction gesture by moving, in response to user interaction, the extraction portion of the document into the extraction location outside of the document view region.

6. The method of claim 5, wherein moving, in response to user interaction, comprises touching a touchscreen input device interfacing with the virtual workspace, and dragging the extraction portion of the document.

7. The method of claim 1, wherein modifying the document view region comprises scrolling the document in response to a scrolling gesture to display the extraction portion of the document when the extraction portion of the document is not currently displayed in the document view region.

8. The method of claim 1, wherein the visible link is only visible for selection upon an actuation event.

9. The method of claim 8, wherein the actuation event comprises, in response to user interaction, touching a touchscreen input device interfacing with the virtual workspace.

10. The method of claim 1, wherein the first excerpt object comprises a text block of the document.

11. The method of claim 1, wherein the document preview region is configured to guide navigation of the document in the document view region; and
wherein, in response to receiving a selection of a preview portion of the document in the document preview region, the document view region displays the preview portion of the document.

12. The method of claim 11, wherein the document preview region is configured to display the entire document simultaneously.

13. The method of claim 1, further comprising receiving a collapse gesture to invoke the collapse command.

14. The method of claim 1, further comprising expanding the intermediate portion of the document in response to an uncollapse command.

15. The method of claim 14, wherein the uncollapse command comprises an uncollapse gesture of an upward swiping over the intermediate portion of the document.

16. The method of claim 1, further comprising:
displaying a first viewable portion of the document in the document view region, wherein a hidden portion of the document is hidden from the document view region;
receiving an annotation input;
creating an annotation object at an annotation location in the virtual workspace outside of the document, in response to receiving the annotation input, the annotation object comprising the annotation input;
receiving a selection of a second viewable portion of the document within the document view region;
providing a graphical link to the second viewable portion of the document;
modifying the document view region to hide the second viewable portion of the document from the document view region;
receiving a selection of the graphical link; and
modifying the document view region to display the second viewable portion of the document in response to the selection of the graphical link.

17. The method of claim 1, wherein the document is a first document, the method further comprising:
displaying a second document in a second document view region of the virtual workspace;
receiving a linking gesture indicating a first linking section in the first document and a second linking section in the second document;
displaying a first graphical link proximate the first linking section in the first document, in response to the linking gesture;
displaying a second graphical link proximate the second linking section in the second document, in response to the linking gesture;
receiving a selection of the first graphical link; and
modifying the second document view region to make the second linking section in the second document visible in the second document view region, in response to the selection of the first graphical link, if the second linking section in second document is not visible in the second document view region at the time of the selection of the first graphical link.

18. The method of claim 1, further comprising:
a physical touch interface for the virtual workspace; and
detecting a touch on the touch interface.

19. The method of claim 1, wherein placement of the first excerpt object is independent of the document and moveable about the virtual workspace.

20. The method of claim 1, wherein placement of the first excerpt object is dependent on the document.

21. The method of claim 1, wherein shrinking the size of the intermediate portion of the document in response to the collapse command comprises removing entirely from view the intermediate portion of the document.

22. The method of claim 1, wherein the visible link is a part of the first excerpt object.

23. The method of claim 1, wherein the visible link touches the first excerpt object.

24. The method of claim 1, wherein in response to the collapse command, the document view region is modified to simultaneously display the first portion of the document and the second portion of the document.

25. The method of claim 1, wherein each of the first collapse object, the second collapse object, and the first excerpt object are different document objects.

26. The method of claim 1, wherein one of the first and second collapse objects comprise the first excerpt object.

27. The method of claim 1, wherein each document object comprises one or more of:
a text portion of the document;
an image portion of the document; and
an annotation portion of the document.

28. A method comprising:
displaying a portion of a document in a document view region of a virtual workspace and displaying a preview of the document in a document preview region, wherein the document preview region is separate from the document view region and displays a representation of the document different than the displayed portion of the document in the document view region;

receiving an extraction gesture indicating an extraction portion of the document from the displayed portion of the document and an extraction location in the virtual workspace, the extraction location being in the virtual workspace outside of the document view region;

displaying two or more document objects in the virtual workspace, the document objects being manipulable and moveable about the virtual workspace in response to user interaction,
   wherein one of the document objects comprises a first excerpt object at the extraction location containing a duplicate copy of content extracted from the extraction portion of the document, in response to the extraction gesture, and
   wherein the first excerpt object comprises a visible link between the first excerpt object and the extraction portion of the document;

receiving a selection of the first excerpt object;

modifying the document view region to display the extraction portion of the document, if the extraction portion of the document is not currently displayed in the document view region, in response to the selection of the first excerpt object;

receiving a modification command comprising:
   selection of a first modification portion of the document in the document view region linked to a first portion of the document; and
while the first modification portion of the document is selected, receiving a selection of a modification location in the document preview region that refers to a second modification portion of the document; and automatically and simultaneously displaying in the document view region the first modification portion of the document and the second modification portion of the document in response to the modification command by repositioning the first and the second modification portions to be displayed closer together within the document view region.

29. The method of claim 28, wherein each document object comprises one or more of:
   a text portion of the document;
   an image portion of the document; and
   an annotation portion of the document.

30. The method of claim 28, further comprising receiving a collapse command to at least a portion of the document, the collapse command comprising:
   selection of a first collapse object in the document view region linked to a first collapse portion of the document; and
   while the first collapse object is selected, receiving a selection of a second collapse object linked to a second collapse portion of the document;
   wherein each of the first and the second collapse objects are document objects; and
   wherein an intermediate collapse portion of the document is positioned between the first collapse portion and the second collapse portion of the document; and
   automatically repositioning in the document view region one or both of the first collapse portion and the second collapse portion of the document in response to the collapse command by shrinking the size of the intermediate collapse portion of the document;
   wherein the first collapse portion and the second collapse portion of the document are displayed closer together in the document view region after repositioning.

31. The method of claim 30, wherein each of the first collapse object, the second collapse object and the excerpt object are different document objects.

32. The method of claim 30, wherein the first collapse object, the second collapse object and the excerpt object comprise at least two different document objects.

33. The method of claim 30, wherein each document object comprises one or more of:
   a text portion of the document;
   an image portion of the document; and
   an annotation portion of the document.

* * * * *